United States Patent
Arendt et al.

(10) Patent No.: US 6,689,830 B1
(45) Date of Patent: Feb. 10, 2004

(54) FILM FORMING COMPOSITIONS CONTAINING BENZOIC ACID ESTERS OF 8-CARBON ALCOHOLS AS ADDITIVES

(75) Inventors: William D. Arendt, Libertyville, IL (US); Mark S. Holt, Barrington, IL (US); Bruce E. Stanhope, Grayslake, IL (US); Bruce E. Streeter, Crystal Lake, IL (US); Eric R. Zimmerman, Algonquin, IL (US)

(73) Assignee: Velsicol Chemical Corporation, Rosemont, IL (US)

( * ) Notice: Subject to any disclaimer, the term of this patent is extended or adjusted under 35 U.S.C. 154(b) by 0 days.

(21) Appl. No.: 09/419,322

(22) Filed: Oct. 15, 1999

(51) Int. Cl.$^7$ .................................................. C08K 5/12
(52) U.S. Cl. ...................... 524/287; 524/140; 524/270; 524/272; 524/284; 524/314; 524/292; 524/297; 524/376; 524/487
(58) Field of Search ................. 524/270, 272, 524/292, 314, 287, 140, 284, 297, 376, 487

(56) References Cited

U.S. PATENT DOCUMENTS

| | | | | |
|---|---|---|---|---|
| 3,484,351 A | * | 12/1969 | Okada et al. ............... | 524/297 |
| 3,817,901 A | * | 6/1974 | Schaafsma ................. | 524/292 |
| 3,877,962 A | * | 4/1975 | Taylor et al. .............. | 427/375 |
| 5,236,987 A | | 8/1993 | Arendt | |
| 5,244,996 A | * | 9/1993 | Kawasaki et al. .......... | 526/347 |
| 5,319,000 A | * | 6/1994 | O'Connor et al. .......... | 523/122 |
| 5,368,795 A | | 11/1994 | Quadir | |
| 5,739,203 A | * | 4/1998 | Ngoc ......................... | 524/527 |
| 5,929,132 A | * | 7/1999 | Hani et al. ................. | 523/122 |

FOREIGN PATENT DOCUMENTS

| | | |
|---|---|---|
| DE | 1962500 | 12/1969 |
| EP | 668338 A2 | 8/1995 |
| WO | WO 9856867 | 12/1998 |

* cited by examiner

Primary Examiner—Judy M. Reddick
(74) Attorney, Agent, or Firm—Fitch, Even, Tabin & Flannery

(57) ABSTRACT

Compositions comprising at least one acrylic, vinyl acetate or epoxide polymer or copolymer as a film-forming ingredient and an ester of benzoic acid wherein the alcohol portion of the ester is alkyl and contains eight carbon atoms exhibit unexpected improvements in film-forming and applied film properties. In preferred compositions this alcohol portion is 2-ethylhexyl. Additionally, the preferred benzoic acid ester frequently interacts synergistically with benzoic acid esters derived from oligomeric ethylene glycols.

19 Claims, No Drawings

FILM FORMING COMPOSITIONS CONTAINING BENZOIC ACID ESTERS OF 8-CARBON ALCOHOLS AS ADDITIVES

BACKGROUND OF THE INVENTION

1. Field of the Invention

This invention relates to organic polymer compositions. More particularly, this invention relates to film-forming polymer compositions containing from 0 µp to about 50 weight percent of pigments and a specified class of esters of benzoic acid to improve certain properties of film-forming compositions and/or films prepared using these compositions. The film-forming polymer in the present compositions is prepared from at least one ethylenically unsaturated ester.

2. Description of the Prior Art

Esters derived from benzoic acid and alcohols containing from 2 to 20 or more carbon atoms are known as plasticizers for homopolymers and copolymers of vinyl chloride. For example, German published application (Offenlegungsschrift) No. 1,962,500 teaches using benzoic acid esters of the formula PhC(O)OR or succinic acid esters as plasticizers for polymers derived at least in part from vinyl chloride. In this formula Ph represents a phenyl radical and R represents an alkyl radical containing from 8 to 13 carbon atoms. The alcohol portion of the succinic acid esters contains from 8 to 13 carbon atoms.

Depending upon the desired end use application, the vinyl chloride polymer can be in the form of an aqueous emulsion that is used either alone or in combination with a powdered solid form of the polymer.

Another group of organic polymers that are useful in film-forming compositions are homopolymers and copolymers prepared from ethylenically unsaturated esters. The ethylenic unsaturation can be in the carboxylic acid or alcohol portion of the ester molecule. Suitable ethylenically unsaturated acids include but are not limited to acrylic and methacrylic acids. The alcohol portion of these esters typically contains from 1 to 4 or more carbon atoms. This family of polymers is referred to as "acrylic polymers". These polymers can optionally include repeating units derived from ethylenically unsaturated hydrocarbons such as ethylene and styrene.

Vinyl acetate is an example of a polymerizable ester derived from an ethylenically unsaturated alcohol and a saturated carboxylic acid. Copolymers of vinyl acetate and olefins such as ethylene are useful for aqueous adhesive compositions.

U.S. Pat. No. 5,236,987 to William Arendt, which issued on Aug. 17, 1993, teaches using certain esters of benzoic acid as coalescents and plasticizing agents for water-based paint compositions containing an emulsified acrylic polymer as the film-forming material. The alcohol portion of the benzoic acid ester contains from 8 to 12 carbon atoms and the polymer is typically present in the composition as an aqueous emulsion.

The major ingredients of the paints described in the Arendt patent typically comprise an emulsified film-forming polymer derived from at least one ester of acrylic and/or methacrylic acid, water, a pigment, a thickening agent and at least one surfactant. The combination of pigment and thickening agent typically constitutes from 20 to 50 percent by weight of the total paint composition.

Film-forming compositions such as inks, adhesives and floor polishes contain different ingredients and types of film forming polymers than paints. Even though the polymers in these compositions are prepared from the same class of monomers as those present in paints, the type(s) of monomer (s), the molecular weight of the polymer, and the presence and interaction of the additional ingredients present in the various types of compositions make it difficult to predict how a coalescent, leveling agent and/or plasticizer suitable for use paint compositions will affect the properties of other film-forming compositions, such as adhesives and polish formulations, and the properties of the resultant films.

European Patent No. 668,338 issued to Rohm and Haas describes adhesive compositions wherein the film-forming material is an acrylic polymer. In addition to the polymer the compositions also include from 0.1 to 40 parts by weight per 100 parts of polymer of a plasticizer. Suitable plasticizers include benzoic acid esters derived from diethylene glycol and/or dipropylene glycol. No benzoate esters derived from aliphatic alcohols are disclosed.

U.S. Pat. No. 5,368,795, which issued on Nov. 29, 1994 to Quadir describes aqueous ceramic slurries containing an ethylene/vinyl acetate copolymer and a plasticizer. While esters of benzoic acid are disclosed as a class, the only specific ester mentioned is dipropylene glycol dibenzoate.

Published PCT Application No. 9,856,867 published on Dec. 17, 1998 describes an adhesive for polyvinyl chloride-based flooring materials. The adhesive contains an aqueous dispersion of an acrylic polymer and a plasticizer. To reduce the volatility of the composition the plasticizer is preferably diethylene glycol dibenzoate and/or dipropylene glycol dibenzoate.

Other classes of compounds disclosed as being effective coalescing, leveling, and/or plasticizing agents for compositions containing polymerized ethylenically unsaturated esters as the film-forming polymer include but are not limited to organic esters such as dioctyl adipate and 2,2,4-trimethyl-1,4-pentanediol mono- and diisobutyrates, esters of phthalic acid wherein the alcohol portion of the ester typically contains from 3 to 10 carbon atoms, partially etherified diols and triols such as 2-(2-ethoxyethoxy) ethanol, and trialkoxyalkyl phosphates such as tributoxyethyl phosphate. Some of these materials, particularly esters derived from aliphatic carboxylic acids such as adipic acid, do not substantially improve either the film-forming properties of aqueous polymer compositions typically used as adhesives, inks, floor polishes and unpigmented coatings, or the appearance of films formed from these compositions.

The present invention is based on the discovery that of the many known classes of coalescing, leveling and plasticizing agents, benzoic acid esters of monohydric alcohols containing 8 carbon atoms are unique with respect to their ability to improve the properties of many types of film-forming compositions, including adhesives, floor polishes and non-pigmented coatings. In many instances the properties of films formed from these compositions are also improved.

Because the various types of film-forming compositions differ considerably from one another with respect to composition and molecular weight of the film-forming polymer and the types of additional required and optional ingredients, one skilled in the art would consider it unlikely that one type of plasticizer would improve the properties of these substantially different compositions.

The present compositions comprise at least one acrylic, vinyl acetate or epoxide polymer or copolymer as the film-forming ingredient and, as a plasticizer, an ester of benzoic acid wherein the alcohol portion of the ester is alkyl and contains eight carbon atoms. In preferred compositions this alcohol portion is derived from 2-ethylhexyl.

Additionally, in some of the present compositions the benzoic acid ester has been found to interact synergistically with benzoic acid esters derived from oligomeric ethylene glycols.

SUMMARY OF THE INVENTION

The present invention provides a film-forming composition comprising:

A) a polymer selected from the group consisting of
(1) homopolymers and copolymers of esters of acrylic and methacrylic acids;
(2) said copolymers wherein a portion of the repeating units are derived from at least one acid selected from the group consisting of acrylic and methacrylic acids;
(3) copolymers of styrene and at least one member selected from the group consisting of esters of acrylic and methacrylic acids;
(4) said copolymers of styrene wherein a portion of the repeating units are derived from at least one acid selected from the group consisting of acrylic and methacrylic acids;
(5) homopolymers of vinyl acetate;
(6) copolymers of ethylene and vinyl acetate; and
(7) homopolymers and copolymers of organic compounds containing at least two epoxide groups per molecule B) an amount sufficient to improve the properties of said films of at least one benzoic acid ester exhibiting the general formula $PhCO(O)R^1$, where Ph represents a phenyl radical and $R^1$ represents a linear or branched hydrocarbon radical containing 8 carbon atoms.

In addition to being more effective plasticizers relative to related benzoic acid esters such as isodecyl benzoate, the present esters sometimes interact synergistically with benzoic acid esters derived from oligomeric ethylene glycols. Examples of these glycol esters include but are not limited to diethylene- and triethylene glycol dibenzoates. As used in the present specification, synergistic interaction implies that the level of certain properties exhibited by a composition containing this combination of benzoic acid esters and/or the films prepared using these compositions are superior relative to the property levels predicted based on the levels imparted by the individual esters used at the same concentration as the blend.

In preferred synergistic combinations, some property levels imparted by the present alkyl benzoates are typically lower than the properties observed using a more expensive plasticizer such as di- or triethylene glycol benzoates and mixtures thereof. The unexpected ability of the present alkyl benzoates, specifically 2-ethylhexyl benzoate, to replace 50 weight percent or more of the considerably more expensive glycol-based benzoate without sacrificing desirable properties such as rapid viscosity development of an adhesive and leveling of a liquid film provides a considerable and unexpected economic advantage for the compositions of the present invention containing this combination of benzoic acid esters.

Some of the specific classes of film-forming compositions suitable for use with the benzoic acid esters and synergistic benzoic acid ester blends of the present invention together with the property improvements imparted by these esters will now be described in detail.

Floor Polishes

A preferred end-use application of the present alkyl benzoates is as a leveling aid for polish compositions intended for use on linoleum and other types of flooring materials containing a wear layer formed from a homopolymer or copolymer of vinyl chloride.

Prior art floor polishes typically contain the following ingredients 1) an aqueous emulsion of a) a homopolymer or copolymer derived from at least one ester of acrylic or methacrylic acid wherein the alcohol portion of the ester contains from 1 to 8 carbon atoms or 2) a copolymer derived from at least one of these esters and up to 20 weight percent, based on total repeating units in said polymer, of styrene;

2) a glycol ether such as diethylene glycol monomethyl ether as a coalescing agent;

3) a solubilized resin such as a rosin-based resin;

4) an aqueous emulsion of an organic wax such as a polyethylene wax; and 5) from 2 to about 4 weight percent of a leveling aid that is typically an ester of phosphoric acid such as tributoxyethyl phosphate.

In addition to the aforementioned ester monomers, the film-forming polymer may also contain a small concentration, typically less than about 5 weight percent, of units derived from acrylic and\or methacrylic acid as a solubizing aid. Relatively minor amounts of additional ingredients such as defoamers, wetting agents, biocides and auxiliary plasticizers can also be present. Isodecyl benzoate is an example of a auxiliary plasticizer typically used in polish compositions for floors.

The present inventors discovered that one of the present benzoic acid esters derived from a monohydric alcohol containing eight carbon atoms can replace three of the ingredients typically present in floor polish compositions, namely 1) the phosphate esters conventionally used as the leveling agent; 2) the aromatic and aliphatic acid esters such as isodecyl benzoate typically used as auxiliary plasticizers; and 3) the esters typically used as coalescing agents. The film formed when the resultant formulation is applied to the polyvinyl chloride wear layer of a flooring material exhibits leveling and an appearance comparable to the phosphate-containing control.

The properties imparted by one of the presently preferred benzoic acid esters, 2-ethylhexyl benzoate, are further improved when the ester is used in synergistic combination with diethylene glycol dibenzoate and/or triethylene glycol dibenzoate. Preferably both of the glycol esters are present in a weight ratio of 1 to 3 parts of the diethylene glycol dibenzoate to 1 part of the triethylene glycol ester.

Films formed when compositions containing these combinations of esters are applied to the polyvinyl chloride wear layer of a flooring material exhibit film leveling and gloss equivalent to prior art phosphate-containing compositions. These properties are typically superior to those achieved using one or both of the constituent benzoic acid esters types (alkyl and glycol) alone at the same concentration as the combined esters.

Adhesives

A second type of film-forming composition exhibiting improved properties and/or processability using the present class of benzoic acid esters are adhesives containing as the film-forming polymer a vinyl acetate homopolymer or a copolymer of vinyl acetate and ethylene containing from 3 to about 10 weight percent of repeating units derived from ethylene. The polymer is present as an aqueous emulsion. Techniques for the emulsion polymerization of ethylenically unsaturated monomers are well known.

In addition to the emulsified film-forming polymer, which can constitute up to 95 weight percent of the adhesive, typically from 30 to about 70 weight percent, and from 5 to about 25 weight percent of a plasticizer, the adhesive compositions typically contain a thickening agent such as cellulose, a water-miscible organic solvent such as a polyhydric alcohol, from 0 up to about 15 weight percent of a filler and up to 5 weight percent of a humectant such as glycerin or propylene glycol.

Benzoic acid esters derived from oligomeric glycols such as diethylene glycol and dipropylene glycol are typically used as plasticizers in aqueous adhesive compositions because these esters are solids at room temperature (typically 25° C.), and therefore do not significantly increase the volatile organic content (V.O.C.) of the composition. In many countries V.O.C. levels are strictly controlled by government regulations.

The prior art teaches that benzoates derived from glycols such as diethylene glycol, triethylene glycol and dipropylene glycol are very desirable for use in adhesives because they provide the desired viscosity increase, open time and set time.

"Open time" refers to the period of time during which a satisfactory bond can be formed between adhesive and the substrate. "Set time" is defined as the time period required for cohesive failure to occur at the bonding surfaces of two substrates bonded by the adhesive.

The major disadvantage of benzoic acid esters derived from oligomeric glycols is their cost.

The primary function of plasticizers in adhesives is to increase the viscosity of the composition. The efficiency of a plasticizer is based on the viscosity increase achieved per unit weight of plasticizer. The present benzoic acid esters, particularly 2-ethylhexyl benzoate, are unexpectedly more efficient than a related alkyl benzoate derived from isodecyl benzoate. The unexpectedly high efficiency of 2-ethylhexyl benzoate makes it possible to replace up to 60 weight percent of one or more glycol dibenzoates with this alkyl benzoate. This preferred combination achieves the same increase in viscosity and values of set and open times with a relatively small increase in V.O.C., and is suitable for use in many end-use applications where V.O.C. levels approaching 0 are not an overriding consideration.

Inks

Water-based flexographic inks used in the printing industry are typically emulsions containing 1) at least one emulsified copolymer derived from acrylic and/or methacylic acid esters; 2) at least one emulsified organic wax; at least one alcohol containing from 2 to 4 carbon atoms, ammonia, water and about 4 weight percent of a coalescent that is typically a partially etherified glycol such as diethylene glycol. The organic polymers and wax typically constitute from 50 to about 60 weight percent of the composition and the pigment from 15 to about 20 weight percent.

The benzoic acid esters of the present invention can replace the partially etherified glycols typically used as coalescing agents for this type of ink composition, but may offer additional advantages as plasticizers and/or viscosity modifiers.

Epoxy Coatings Formulations

The plasiticizer compositions of the present invention can be used to improve the film-forming properties of aqueous compositions containing as the film-forming polymer an organic compound containing at least two epoxide groups per molecule. The hydrocarbon radical in which the epoxide groups are present can be aliphatic, cycloaliphatic or aromatic.

Examples of epoxy coating formulations suitable for use with the plasticizers of the present invention include aliphatic diepoxides such as 1,2,9,10 decanediepoxide, cycloaliphatic diepoxides such as 1,4-cyclohexane diepoxide and aromatic diepoxides such as the diglycidyl ethers of the various bis-phenols, including bis-phenol A crosslinked with aliphatic, cycloaliphatic or aromatic amines.

Benzyl alcohol and related alcohols have been used as plasticizers in epoxy coating formulations. The use of benzoic acid esters of the present invention as replacements for all or part of these alcohols allows the coatings formulator to produce low volatile organic content coatings while retaining the viscosity and solvating characteristics of the alcohols.

In addition to the aforementioned applications the benzoic acid esters of the present invention can be used in latex caulk formulations in place of the aliphatic acid esters currently used to improve the paintablilty of the composition following application and curing.

The following examples demonstrate the desirable properties imparted to different types of film-forming compositions by the benzoic esters of the present compositions. These examples should not be interpreted as limitations on the scope of the present invention as defined in the accompanying claims.

EXAMPLE 1

This example demonstrates the improved leveling, gloss and hardness achieved in two different floor polish compositions when the organic phosphate typically used as a leveling agent is replaced by 2-ethylhexyl benzoate.

A conventional floor polish compositions evaluated as a control and referred to hereinafter as IC was prepared by blending the following ingredients to homogeneity:

33.5 parts of water 48.6 parts of an aqueous emulsion containing 38 weight percent of a styrene-modified acrylic copolymer available as Duraplus(R)3 from the Rohm and Haas Company, Philadelphia, Pa., USA;

1.43 parts of 2,2,4-trimethyl-1,3-pentanediol monoisobutyrate as a coalescing agent 5.6 parts of diethylene glycol monomethyl ether as a coalescing agent;

3.52 parts of a 30 weight percent solution in ethanol of a modified styrene/acrylic resin available as Chemrez 30 from Chem Cor Corporation 3.29 parts of a 40 weight percent aqueous emulsion of a polyethylene wax available as Epolene® E-43N from Eastman Chemicals;

3.13 parts of tributoxyethyl phosphate as a leveling agent, and less than 0.1 percent each of (1) a biocide available as Kathon E from Rohm and Haas Corporation (2) a fluorinated polyether available as Fluorad® FC-120 as a wetting agent and (3) as a defoaming agent, a 30 weight percent aqueous solution of an anionic surfactant, available as Abex-18S.

A second control composition evaluated as a floor polish will be referred to hereinafter as IIC and contained the following ingredients:

33.12 parts of water 45.83 parts of an aqueous emulsion containing 38 weight percent of a styrene-modified acrylic copolymer available as UHS Plus from Rohm and Haas Company;

as the coalescing agent, 5.0 parts of diethylene glycol monomethyl ether and 1.25 parts of dipropylene glycol monomethyl ether;

as the leveling agent, 2.5 parts of tributoxyethyl phosphate;

as an auxiliary plasticizer, 1.25 parts of isodecyl benzoate;

4.13 parts of a polyethylene emulsion available as AC® 325N from Allied Signal Chemical;

3.54 parts of a 30 weight percent solution in ethanol of a modified styrene/acrylic copolymer resin available as Chemrez 30 from Chem Cor Corporation;

3.29 parts of a 40 weight percent aqueous emulsion of a polyethylene wax available as Epolene® E-43N from Eastman Chemicals; and less than 0.1 percent each of (1) a biocide available as Kathon C from Rohm and Haas Company, (2) a fluorinated polyether available as Fluorad(R) FC-120 from 3M Company as a wetting agent and (3) a silicone type defoamer.

In compositions of the present invention, referred to hereinafter as I, II and III, the combined weights of tributoxyethyl phosphate and 2,2,4-trimethyl-1,3-pentanediol monoisobutyrate used in composition IC were replaced on an equal weight basis with single and multiple benzoate ester compositions of the present invention. These were (1) 2-ethylhexyl benzoate, referred to hereinafter as plasticizer A; (2) a 1:2 weight ratio mixture of 2-ethylhexyl benzoate and a mixture containing diethylene glycol dibenzoate and triethylene glycol dibenzoate in a weight ratio of 2:1, referred to hereinafter as plasticizer B; and (3) a 1:1 weight ratio mixture of 2-ethylhexyl benzoate and the glycol dibenzoate mixture of (2), referred to hereinafter as plasticizer C.

In additional compositions of the present invention, referred to as IV, V and VI, the 2.5 parts of tributoxyethyl phosphate and 1.25 parts of isodecyl benzoate in IIC were replaced with 1.9 parts each of plasticizer A in composition IV, plasticizer B in composition V, and plasticizer C in composition VI.

All of the polish compositions evaluated were prepared by blending all ingredients for 30 minutes using a Cowles type mixer rotating at a speed of 500 RPM.

The following test procedures were used to evaluate the polish compositions of the present invention and the two prior art compositions containing an organic phosphate as the leveling agent.

Leveling

Six layers of the composition to be evaluated were applied to half of a composite vinyl tile using a 2×4 inch (5 by 10 cm) gauze pad at a concentration of 4 cc per square foot. In the same manner a commercially available polish was applied to the other half of the tile as a control. Immediately following the application of each layer a block letter "S" about 10 cm. in height and 5 cm. in width was drawn in the surface of each wet material with the gauze used to apply the material and the coating allowed to dry. Each dried coating was rated subjectively on a scale of from poor (P) to excellent (E) based on upon the legibility of the original "S". The results of the evaluation are recorded in the following Table I.

TABLE I

Composition I

| Composition | Leveling Rating After n Coats n = | | | | | |
|---|---|---|---|---|---|---|
| | 1 | 2 | 3 | 4 | 5 | 6 |
| IC | VG | E | E | E | E | E |
| I | G | E | VG | E | VG | VG |
| II | G | P | P | VG | VG | VG |
| III | G | E | E | E | E | E |
| IIC | VG | E | E | E | E | E |
| IV | G | E | VG | E | VG | VG |
| V | G | P | P | VG | VG | VG |
| VI | G | E | E | E | E | E |

P = poor
G = good
VG = very good
E = excellent

The foregoing data demonstrate that formulations I and IV containing 2-ethylhexyl benzoate in place of the prior art phosphate exhibited leveling nearly as good as the prior art phosphate. When this benzoate was combined with the blend of di-and triethylene glycol benzoates, the 1:1 ratio of alkyl to glycol benzoates in compositions II and V was inferior to both the prior art phosphate compositions IC and IIC and the alkyl benzoate alone. These data indicates that the glycol benzoates are not as effective leveling agents as the alkyl benzoate.

Increasing the relative concentration of the alkyl benzoate in the benzoate mixture from 33 to 50 percent in compositions III and VI resulted in an unexpected level of improvement to match the control compositions containing the prior art phosphate. This degree of leveling cannot be achieved using the alkyl benzoate alone or in a 1:1 weight ratio with the blend of glycol benzoates.

Gloss Development

Six coats of the eight formulations described in the preceding section of this example were applied at a rate of 4 cc. per ft.$^2$ (43 cc per m.$^2$) on to a 8 in.$^2$ (51.6 cm$^2$) area of a black polyvinyl chloride floor tile using a gauze pad. Each layer of polish was allowed to dry under ambient conditions for 40 minutes prior to being evaluated for gloss development, following which the next layer was applied.

Gloss development was measured at an angle of 60° using a model 4520 Glossimeter manufactured by BYK Gardner Corporation.

The results of this evaluation are recorded in the following table II using a scale from 0 (lowest gloss) to 100 (highest gloss).

TABLE II

| Composition | Gloss Development Following n Coats n = | | | | | |
|---|---|---|---|---|---|---|
| | 1 | 2 | 3 | 4 | 5 | 6 |
| IC | 30 | 65 | 85 | 90 | 90 | 92 |
| I | 30 | 60 | 77 | 80 | 80 | 87 |
| II | 30 | 55 | 70 | 80 | 90 | 87 |
| III | 30 | 68 | 85 | 90 | 90 | 92 |
| IIC | 25 | 70 | 88 | 90 | 92 | 93 |
| IV | 28 | 63 | 82 | 82 | 85 | 90 |
| V | 30 | 65 | 82 | 88 | 92 | 93 |
| VI | 25 | 65 | 88 | 90 | 92 | 93 |

The data in Table II demonstrate that the 1:1 weight ratio blend of 2-ethylhexyl benzoate and the mixed glycol benzoates in compositions III and VI was equivalent to the corresponding controls, superior to both 2-ethylhexyl benzoate alone in composition I and IV and the 1:2 weight ratio of 2-ethylhexyl benzoate:mixed glycol benzoates in compositions II and V.

Hardness Development

A 0.5 cc. portion of formulations I, II, III and IC were applied individually to a rectangular glass slide measuring 2 inches by 3 inches (5 by 7.5 cm) and allowed to dry for 3 days. The resultant films were evaluated for hardness using ASTM test method D 4366. The results of the evaluations are recorded in the following table.

| Composition | Konig Hardness Value |
|---|---|
| IC | 30 |
| I | 120 |
| II | 97 |
| III | 63 |

In this instance 2-ethylhexyl benzoate had the highest hardness value. The hardness value decreased with increasing concentration of the mixed glycol benzoates. The control composition containing the prior art tributoxyethyl phosphate as the leveling agent exhibited the lowest hardness value.

EXAMPLE 2

This example demonstrates the ability of the present benzoic acid ester composition to replace considerably more expensive glycol benzoates in aqueous adhesives. Benzoic acid esters are used to increase the viscosity of these adhesives without altering the cure characteristics of the composition.

The adhesive compositions contained an aqueous emulsion of a vinyl acetate homopolymer and at least one benzoic acid ester. The polymer is available as Vinac(R)XX 230 from Air Products Company.

The plasticizer compositions evaluated were 1) a mixture of the present invention containing 67.5 weight percent of (a) a mixture consisting of a 2:1 weight ratio mixture of diethylene glycol dibenzoate : triethylene glycol dibenzoate, and 32.5 weight percent of (b) 2-ethylhexyl benzoate;

2) a mixture of the present invention containing 85 weight percent of (a) and 15 weight percent of (b), where (a) and (b) are described in the preceding plasticizer composition 1.

3) as a control, a plasticizer containing 25 weight percent of dipropylene glycol dibenzoate, 50 weight percent of diethylene glycol dibenzoate and 25 weight percent triethylene glycol dibenzoate. The dipropylene glycol dibenzoate was added to decrease the freezing temperature of the mixture.

Each the plasticizer compositions were used at a concentration of 10 and 25 weight percent, based on the combined weight of polymer emulsion and plasticizer.

The compositions were evaluated using the following testing procedures.

Viscosity

The viscosities of all compositions were measured using a Brookfield viscometer equipped with a number 3, 4 or 5 spindle, depending upon the viscosity of the sample being evaluated. the spindle speeds were 2.5 and 20 RPM The viscosity of each composition was measured 1 hour and 24 hours following preparation. The results of this evaluation are recorded in the following table.

Open time

Fifty pound weight Kraft paper that had previously been stored for at least 24 hours at 230 C. and 50 percent relative humidity was cut into strips measuring 1.5 by 12 inches (3.7 by 30.5 cm.) and 1 by 12 inches (2.5 by 30.5 cm.). One of the narrower strips was centered on top of one of the wider strips and the two were clamped together at one end. The narrower strip was then pulled away from the wider one at an angle of about 180 degrees, at which time a #14 wire-wound Meyers rod was placed on the upper surface of the narrower strip at the clamping point. A rod without a wire winding exhibiting the same diameter as the other rod was then placed behind the number 14 rod on what was originally the lower surface of the upper strip. The purpose of the wireless rod was to prevent the upper strip from returning to its original position on top of the lower one.

About 3 grams of the adhesive to be evaluated was deposited on the exposed surface of the wider strip adjacent to the clamp and applied as a continuous coating on this strip using a #16 wire-wound Meyers rod, leaving a small uncooked area at the free ends of the strips. The rod used to apply the adhesive sample was then removed and a stopwatch was then started. When the time interval to be evaluated as open time had elapsed, the two remaining rods, located on opposite sides of the narrower strip were brought together and pulled over a two second interval as a single unit toward the free end of the strips under a moderate pressure, causing the mating surfaces of the two strips to become bonded together. Following a ten-second interval the two strips were pulled apart by grasping them at the uncoated areas. If some cohesive failure occurs, as evidenced by transfer of fibrous material from the paper to the adhesive layer, the adhesive was still considered "open", i.e. capable of adhering the two strips of paper together.

Testing of additional pairs of paper strips is continued at about five minute intervals until no fibrous material was observed in the adhesive layer. In subsequent tests the initial time interval of five minutes between observations of partial and no cohesive failure was decreased until the actual time interval between application of the adhesive and the observation of adhesion loss could be determined to the nearest second. This value was recorded as the "open time".

Set Time

Set time was measured using the same test samples and equipment described in the immediately preceding test for measuring open time. In this instance the adhesive was applied over the exposed surface of the wider strip using the number 16 wire-wound Meyers rod and starting near the clamp used to join the upper and lower sheets of paper. The number 14 wire-wound Meyers rod was located directly behind the number 16 wire-wound rod and on the opposite side of the narrower layer of paper. The adhesive layer was applied as described in the preceding section of this example A stopwatch was started, at which time the bonded layers of paper were gradually pulled apart over a 5 to 15 second interval. This interval was adjusted to achieve complete cohesive failure within the test period. The interface between the two layers was observed to determine the percentage of fibers that were at least partially torn from the paper layers and became bonded to the adhesive. The time interval from joining of the two paper layers to achieving 80% fiber tear within the paper, considered complete cohesive failure, is referred to as the "set time".

| Plasticizer Composition | | | | | | |
|---|---|---|---|---|---|---|
| | 1 | | 2 | | 3* | |
| | Concentration (wt. %) | | | | | |
| | 10 | 25 | 10 | 25 | 10 | 25 |
| Viscosity after 1 hour | | | | | | |
| 2.5 RPM | 5000 | 14400 | 5060 | 14000 | 4840 | 13800 |
| 20 RPM | 3100 | 7800 | 3185 | 7740 | 3075 | 7730 |
| 24 hours | | | | | | |
| 2.5 RPM | 5480 | 15440 | 5620 | 15200 | 5500 | 14520 |
| 20 RPM | 3440 | 8520 | 3300 | 8440 | 3450 | 8260 |
| Open Time, sec. | ND | ND | 12 | 30 | 9 | 27 |
| Set Time, sec. | ND | ND | 12 | 11 | 12 | 12 |

*= control

The viscosity and curing time data for the, compositions 1 and 2 of the present invention are similar to those of the control, a commercially acceptable but more costly benzoic acid ester composition derived from oligomeric ethylene and propylene glycols.

EXAMPLE 3

This example demonstrates the improved volatile organic content of epoxy coating formulations when benzyl alcohol is replaced by 2-ethylhexyl benzoate.

Two epoxy coating formulations were prepared from a diepoxide and a diamine crosslinker. One formulation contained benzyl alcohol and one contained 2-ethylhexyl benzoate. The volatile organic content was measured by EPA Test 24. The formulation containing 2-ethylhexyl benzoate had significantly lower volatile organic content.

That which is claimed is:

1. A film-forming composition selected from the group consisting of adhesives, inks and epoxide-based coatings, wherein said composition comprises:
   A) a polymer selected from the group consisting of
      (1) homopolymers and copolymers comprising repeating units of esters of acrylic and methacrylic acids;
      (2) said copolymers wherein a portion of the repeating units are derived from at least one acid selected from the group consisting of acrylic and methacrylic acids;
      (3) copolymers comprising repeating units of styrene and at least one member selected from the group consisting of esters of acrylic and methacrylic acids;
      (4) said styrene copolymers wherein a portion of the repeating units are derived from at least one acid selected from the group consisting of acrylic and methacrylic acids;
      (5) homopolymers comprising repeating units of vinyl acetate;
      (6) copolymers comprising repeating units of ethylene and vinyl acetate; and
      (7) homopolymers and copolymers comprising repeating units of organic compounds containing at least two epoxide groups per molecule; and
   B) from 0.1 to 40 weight percent of said composition of a plasticizer for said polymer, wherein said plasticizer comprises
      at least one benzoic acid ester exhibiting the formula $PhCO(O)R^1$, where Ph represents a phenyl radical and $R^1$ represents a linear or branched hydrocarbon radical containing 8 carbon atoms, and
      at least one additional benzoic acid ester selected from the group consisting of diethylene glycol dibenzoate and triethylene glycol dibenzoate, wherein the combined weight of all additional benzoic acid esters is from 0.5 to 2 times the weight of the ester corresponding to said formula.

2. A film-forming composition according to claim 1 wherein said composition further comprises from 0.1 to 25 percent, based on the total weight of said composition, of at least one additive selected from the group consisting of pigments and fillers.

3. A film-forming composition according to claim 1 wherein said composition contains no pigment or filler.

4. A film-forming composition according to claim 1 where said polymer is present as an aqueous emulsion.

5. A film-forming composition according to claim 4 where $R^1$ is 2-ethylhexyl.

6. A film-forming composition according to claim 4 wherein said polymer is selected from the group consisting of
   (A) homopolymers and copolymers comprising repeating units of esters of acrylic and methacrylic acids wherein the alcohol portion of said esters contains from 1 to 8 carbon atoms;
   (B) said copolymers of (A) wherein a portion of the repeating units are derived from at least one acid selected from the group consisting of acrylic and methacrylic acids;
   (C) copolymers comprising repeating units of styrene and at least one member selected from the group consisting of esters of acrylic and methacrylic acids wherein the alcohol portion of said esters contains from I to 8 carbon atoms, and repeating units derived from styrene constitute from 0.1 to 15 weight percent of the repeating units present in said copolymers;
   (D) copolymers of (C) wherein a portion of the repeating units are derived from at least one acid selected from the group consisting of acrylic and methacrylic acids;
   (E) homopolymers comprising repeating units of vinyl acetate and copolymers thereof with at least one comonomer selected from the group consisting of ethylene, esters of acrylic acid and esters of methacrylic acid, wherein from 80 to 99.8 mole percent of the repeating units in said copolymers are derived from vinyl acetate.

7. A film-forming composition according to claim 6 wherein said aqueous emulsion constitutes from 10 to 95 weight percent of said composition.

8. A film-forming composition according to claim 7 wherein said composition is a liquid at 25° C.

9. A film-forming composition according to claim 1 wherein
   A. said polymer is selected from the group consisting of
      (1) said copolymers comprising repeating units of at least two esters selected from the group consisting of esters of acrylic and methacrylic acid, and
      (2) said copolymers comprising repeating units of (a) at least one ester selected from the group consisting of esters of acrylic and methacrylic acids and (b) styrene;
   B. said polymer is either crosslinked or exhibits a weight average molecular weight of at least 1,000,000; and
   C. the benzoic acid ester corresponding to said formula is 2-ethylhexyl benzoate and constitutes from 0.1 to 35 weight percent of said composition.

10. A film-forming composition according to claim 9 wherein said composition further comprises an emulsified polyolefin wax, a coalescent for said polymer, a rosin-based resin, and said benzoic acid ester functions as a leveling aid.

11. A film-forming composition according to claim 10 wherein said polymer constitutes from 40 to 60 weight percent of said composition, said coalescent constitutes from 4 to 6 weight percent of said composition, said emulsified polyolefin wax constitutes from 4 to 20 weight percent of said composition, and said resin constitutes from 1 to 5 percent by weight of said composition.

12. A film-forming composition according to claim 11 wherein said coalescent is selected from the group consisting of etherified glycols and said polyolefin wax is a polyethylene wax.

13. A film-forming composition according to claim 12 wherein said composition contains less than one weight percent of at least one additive selected from the group consisting of biocidal agents, wetting agents and defoamers.

14. A film-forming composition according to claim 5 wherein the weight ratio of diethylene glycol dibenzoate to triethylene glycol dibenzoate is from 1:1 to 3:1 and the combined weight of all benzoic acid esters constitutes from 0.1 to 35 percent by weight of said composition.

15. A film-forming composition according to claim 1 wherein said polymer is a copolymer comprising repeating units of at least two monomers selected from the group consisting of esters of acrylic acid, methacrylic acid and styrene;

said polymer comprises from 35 to 55 weight percent of said composition;

at least a portion of said copolymer is present as an aqueous emulsion; and said composition further comprises from 10 to 35 weight percent of an organic pigment, from 1 to 10 weight percent of a coalescent for said polymer, from 0.5 to 8 weight percent of ammonia, from 1 to 5 weight percent of an emulsified polyolefin wax, and from 1 to 8 weight percent of at least one alcohol containing from 2 to 4 carbon atoms, wherein all weight percentages are based on the total weight of said composition.

16. A film-forming composition according to claim 1 in the form of an adhesive comprising from 50 to 95 weight percent of an emulsified polymer selected from the group consisting of polyvinyl acetate and copolymers comprising repeating units of vinyl acetate and ethylene, and from 5 to 25 percent by weight, based on the total weight of said composition, of 2-ethylhexyl benzoate.

17. A film-forming composition according to claim 11 wherein said organic compounds are selected from the group consisting of aliphatic, cycloaliphatic and aromatic diepoxides.

18. A film-forming composition according to claim 17 wherein said composition further comprises a cross linking agent.

19. A film-forming composition according to claim 18 wherein said cross linking agent is selected from the group consisting of aliphatic amines, cycloaliphatic amines, aromatic amines and carboxylic acids.

* * * * *

UNITED STATES PATENT AND TRADEMARK OFFICE
CERTIFICATE OF CORRECTION

PATENT NO. : 6,689,830 B1
DATED : February 10, 2004
INVENTOR(S) : Arendt et al.

It is certified that error appears in the above-identified patent and that said Letters Patent is hereby corrected as shown below:

Title page,
Item [75], Inventors: change "Zimmerman" to -- Zimmermann --

Column 14,
Line 17, change "11" to -- 1 --.

Signed and Sealed this

Sixth Day of July, 2004

JON W. DUDAS
*Acting Director of the United States Patent and Trademark Office*